(12) United States Patent
Siegel

(10) Patent No.: US 10,102,652 B2
(45) Date of Patent: Oct. 16, 2018

(54) BINNING TO PREVENT OVERPLOTTING FOR DATA VISUALIZATION

(71) Applicant: Mark Siegel, Vancouver (CA)

(72) Inventor: Mark Siegel, Vancouver (CA)

(73) Assignee: Business Objects Software Ltd., Dublin (IE)

(*) Notice: Subject to any disclaimer, the term of this patent is extended or adjusted under 35 U.S.C. 154(b) by 338 days.

(21) Appl. No.: 14/496,761

(22) Filed: Sep. 25, 2014

(65) Prior Publication Data
US 2016/0093073 A1 Mar. 31, 2016

(51) Int. Cl.
G06T 11/20 (2006.01)
G06T 11/00 (2006.01)

(52) U.S. Cl.
CPC .......... *G06T 11/206* (2013.01); *G06T 11/001* (2013.01); *G06T 11/20* (2013.01)

(58) Field of Classification Search
None
See application file for complete search history.

(56) References Cited

U.S. PATENT DOCUMENTS

| | | | |
|---|---|---|---|
| 8,243,102 B1* | 8/2012 | Cornell | G06T 15/20 345/418 |
| 2010/0182320 A1* | 7/2010 | Cartan | G06T 11/206 345/440 |
| 2014/0049538 A1* | 2/2014 | Baudel | G06T 15/10 345/419 |
| 2014/0125673 A1* | 5/2014 | Ankisettipalli | G06T 11/206 345/440 |

OTHER PUBLICATIONS

William D. Dupont, W. Dale Plummer Jr., "Density Distribution Sunflower Plots", Journal of Statistical software, published by the Foundation for Open Access Statistics, published Jan. 17, 2003, https://www.jstatsoft.org/article/view/2301.*
Hao, Ming C., et al. "Visual analytics of large multi-dimensional data using variable binned scatter plots." IS&T/SPIE Electronic Imaging. 2010.*
Shneideman, Ben; "Extreme Visualization: Squeezing a Billion Records into a Million Pixesl"; Human-Computer Interaction Lab & Department of Computer Science, University of Maryland; Jun. 9, 2008; 10 pages.
Few, Stephen; Solutions to the Problem of Over-Plotting Graphs; Visual Business Intellgence Newsletter, Sep./Oct. 2008; 6 pages.

* cited by examiner

*Primary Examiner* — Sarah Le
(74) *Attorney, Agent, or Firm* — Fish & Richardson P.C.

(57) ABSTRACT

The present disclosure involves systems, software, and computer-implemented methods for preventing overplotting for data visualization. An example method includes identifying a request to generate a chart including a plotting area indicating a set of data points to be displayed in the plotting area of the generated chart; determining that the requested chart will be unsuitable for display; dividing the plotting area into a plurality of bins, each having a shape configured to tessellate the plotting area in response to determining that the requested chart will be unsuitable for display; assigning each data point to one of the plurality of bins based on a position of each data point within the plotting area of the requested chart; and generating a modified chart including the plotting area of the requested chart including the plurality of bins each configured to indicate a number of data points are assigned to the particular bin.

13 Claims, 9 Drawing Sheets

BINNING TO PREVENT OVERPLOTTING FOR DATA VISUALIZATION

BACKGROUND

The present disclosure involves systems, software, and computer-implemented methods for performing binning to prevent overplotting for data visualization.

Data visualization provides visual representation of data to convey information. For example, data visualization may represent data in graphs, maps, tables, or a combination of these and other types of visual representations to facilitate a user (e.g., a data analyst, a non-technical reviewer, etc.) reviewing and analyzing the data. Based on the visualization, patterns, trends, and relationships in the data points may be identified.

SUMMARY

The present disclosure involves systems, software, and computer-implemented methods for performing binning to prevent overplotting for data visualization. In one general aspect, an example method includes identifying a request to generate a chart including a plotting area, the request indicating a set of data points to be displayed in the plotting area of the generated chart; determining that the requested chart will be unsuitable for display based on the request; dividing the plotting area into a plurality of bins, each of the bins having a shape, the shapes of the bins configured to tessellate the plotting area in response to determining that the requested chart will be unsuitable for display; assigning each data point from the set of data points to one of the plurality of bins based on a position of each data point within the plotting area of the requested chart; and generating a modified chart including the plotting area of the requested chart, the plotting area including the plurality of bins, and each particular bin of the plurality of bins configured to indicate a number of data points from the set of data points that are assigned to the particular bin.

While generally described as computer-implemented software embodied on non-transitory, tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DETAILED DESCRIPTION

Figure 1A:
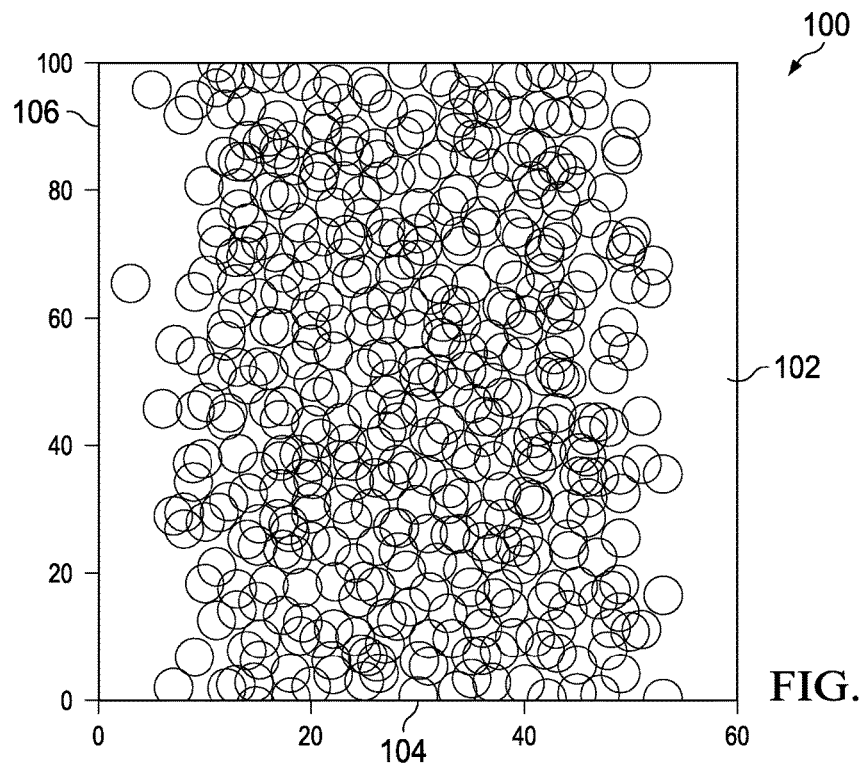
FIG. 1A is a plot illustrating an example visualization of a first set of data.

Data visualization may be used for discovery and communication of meaningful patterns and trends in data. For example, in business analytics or other applications, data visualization may be used to generate visual representations of business data to describe and reveal information contained in the data. The data visualization may be presented in a user interface (e.g., a display, a touchscreen, etc.) and reviewed by a user. The data visualization may be relied upon to analyze, predict, and improve business performance. In this disclosure, the term "chart" is used to mean any type of visual representation of data, such as, for example, images, plots, figures, drawings, graphs, histograms, maps, tables, etc.

Such data visualizations may need to handle massive, complex data sets including a large number of data points. Presenting these data sets in a concise and legible manner may be challenging. For instance, some applications may require thousands of data points to be presented in a relative small display (e.g., on a mobile phone, a tablet, etc.). Generating a chart in a relative small plotting area for a large number of data points may lead to "overplotting," in which some data points are plotted on top of others. In such cases, the data points may cluster together, overlapping and obscuring one another. Overplotting may make it difficult to observe the individual values or other properties of the data, and thus may undermine data analysis. In order to take advantage of the capabilities of data visualization, techniques that eliminate, reduce, or otherwise prevent overplotting are desirable.

The present disclosure describes techniques for reducing overplotting for data visualization, for example, by binning. Binning includes a process by which a plotting area is divided into segments (also referred to bins or tiles). The plotting area may be a one-dimensional flat surface or a higher-dimensional surface. The shapes of the bins are chosen such that the bins "tessellate" the plotting area, meaning the bins cover the plotting area with no overlaps and no gaps between them. Example geometric shapes of the bins include triangles, rectangles, squares, hexagons, or other shapes or combinations of shapes that can tessellate the plotting area.

To reduce the effect of overplotting, each data point in the data set may be assigned to one of the bins in the plotting area. For example, a particular data point may be assigned to the bin covering the portion of the plotting area in which it appears. The bins, rather than the individual data points, can then be presented in a rendered chart. Because the bins tessellate the plotting area without overlaps, they may better visually present the data points without obscuring one another. In some implementations, the bins may describe the distribution or other properties of data points over the plotting area. For example, the relative density (e.g., the numbers of the data points in different bins) may be reflected by color, size, or other attributes of the bins and become readily visible to a reviewer. In some cases, the produced chart may be interactive such that each bin in the chart may be clicked by the user to "drill down" on the data points in that particular bin. For example, if a user clicks on a particular bin, a new chart may be produced with a plotting area "zoomed" to only show the range of values represented by the particular bin. The individual data points included in the bin may be presented in this zoomed plotting area in a new chart.

In some implementations, automatic binning and overplotting detection functions may be provided. As such, a client or a user may be unaware of decisions about when and how to perform binning to prevent overplotting. Such decisions may, in some cases, be made automatically, for example, by a visualization engine. In some implementations, user interaction may be provided and enhanced, for example, by providing suggestions or recommendations to the user when overplotting is detected and allowing the user to specify a desired representation of the data (e.g., specify whether to perform binning or not, the size/shape/placement of the bins, etc.). Additional or different visualization options and user interaction enhancements may be provided.

Implementations according to the present disclosure may provide several advantages over prior techniques. By binning the plotting area and presenting bins of data points rather than individual data points, a previously illegible chart may be modified to present useful information. Further, by rendering bins rather than each individual data point, the number of elements that need to be rendered for a particular chart may be drastically decreased, leading to greater system performance. In addition, by allowing a user to select a particular bin and "drill down" to a view of the data points in that particular bin, more targeted and useful information may be presented to the user.

Figure 1B:
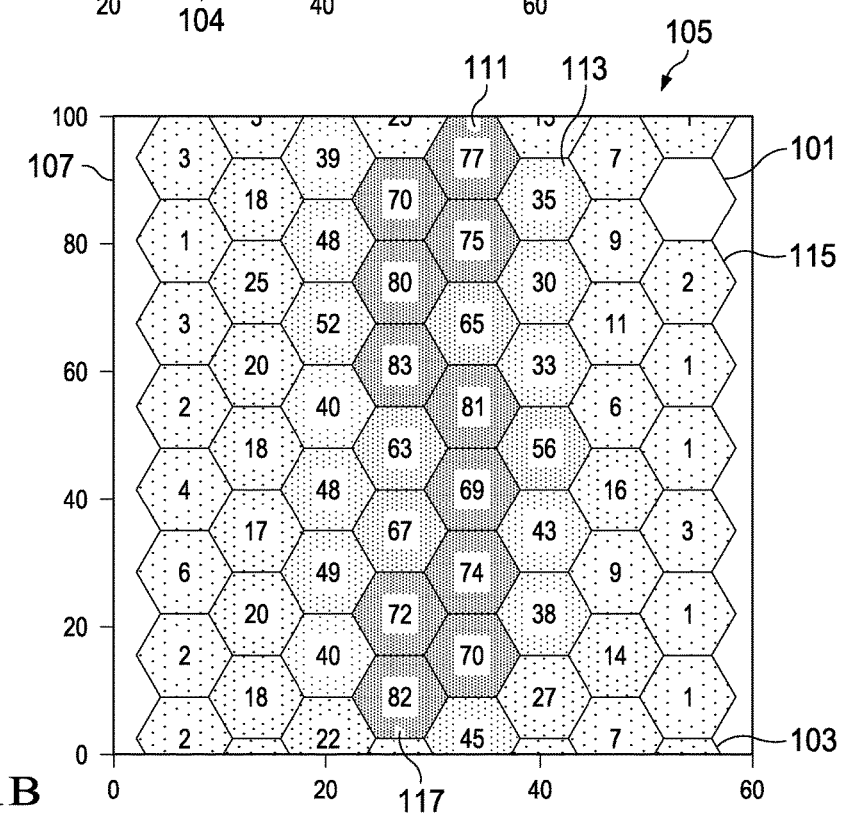
FIG. 1B is a plot illustrating an example visualization of the first set of data with binning.

FIG. 1A is a plot illustrating an example visualization 100 of a first set of data points; FIG. 1B is a plot illustrating an example visualization 105 of the first set of data points with binning. The first set includes about 2000 data points. FIG. 1A includes a plotting area 102 defined by a horizontal axis (or x-axis) 104 and a vertical axis (or y-axis) 106; FIG. 1B includes a plotting area 101 defined by a horizontal axis 103 and a vertical axis 107. The horizontal axes 104 and 103 represent continuous values ranging from 0 to 60; the vertical axes 106 and 107 represent continuous values ranging from 0 to 100. Each of the axes 103, 104, 106, and 107, thus, are "continuous" axes.

Figure 2A:
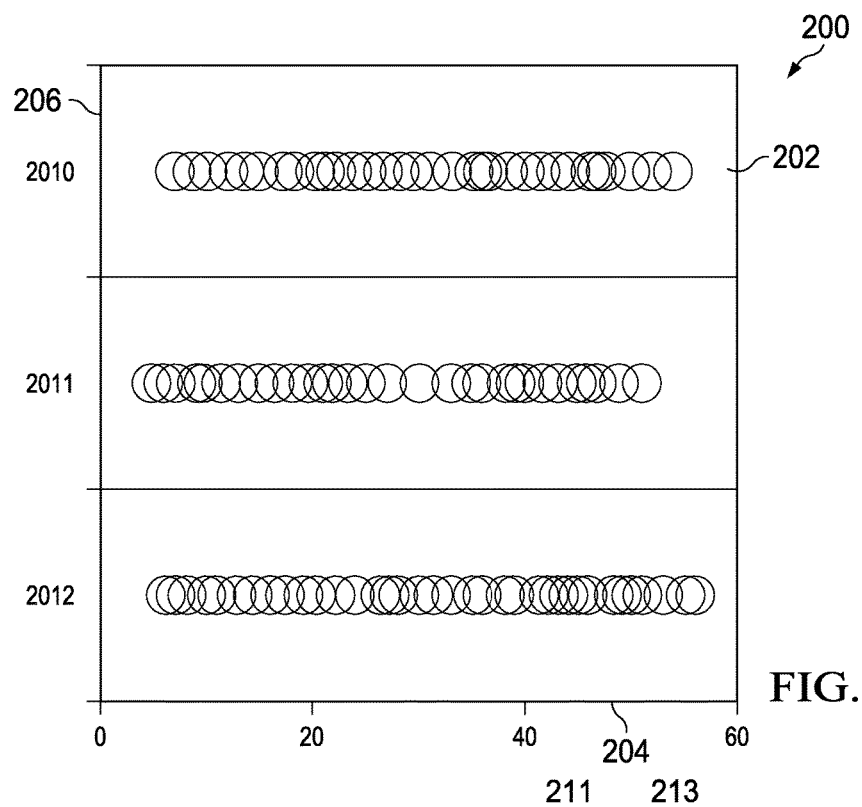
FIG. 2A is a plot illustrating an example visualization of a second set of data.
Figure 2B:
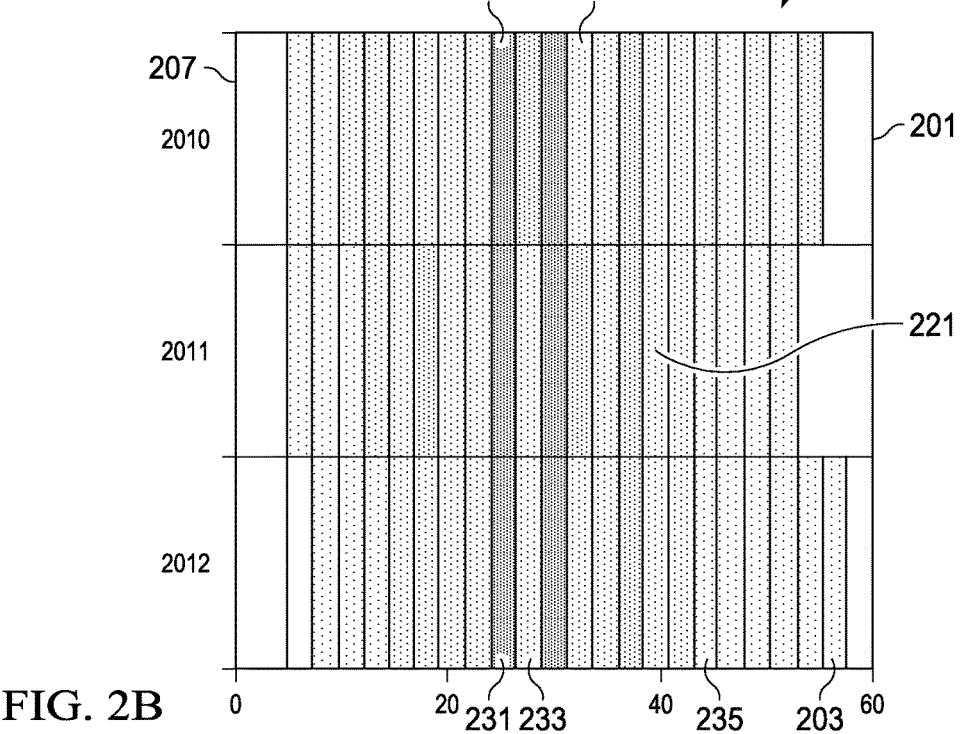
FIG. 2B is a plot illustrating an example visualization of the second set of data with binning.

FIG. 2A is a plot illustrating an example visualization 200 of a second set of data points; FIG. 2B is a plot illustrating an example visualization 205 of the second set of data points with binning. The second set includes about 2000 data points. FIG. 2A includes a plotting area 202 defined by a horizontal axis 204 and a vertical axis 206; FIG. 1B includes a plotting area 201 defined by a horizontal axis 203 and a vertical axis 207. The horizontal axes 204 and 203 represent continuous values ranging from 0 to 60; the vertical axes 206 and 207 includes three discrete categories 2010, 2011 and 2012. The vertical axes 206 and 207, thus, are "discrete" axes.

As illustrated in FIGS. 1A and 2A, a large number of data points overlap with each other in the rendered visualizations 100 and 200. While it may be relatively easy to identify the min/max ranges of the data points (e.g., based on the ranges of the horizontal axes 104, 204 and vertical axes 106, 206), it may be difficult for a user to analyze or conclude the relative distribution, relationship, or other attributes of the data points.

On the other hand, the example visualization 105 with binning in FIG. 1B includes the plotting area 101 that is tessellated into a number of hexagons (e.g., hexagons 111, 113, 115, etc.). As such, the example visualization 105 may be referred to as a hex-binned chart. Each hexagon displays the number of data points included in the portion of the plotting area it covers. For example, the hexagon 111 shows that 77 data points are included in its portion of the plotting area, while the hexagon 115 shows that 2 data points are included in its portion of the plotting area. The hex-binned chart 105 shows relative data distribution in the plotting area 101. For example, certain portions (e.g., the hexagons 111, 117) have more data points than others (e.g., the hexagons 113, 115). In addition, the hex-binned chart 105 indicates that there are more data points near the value 30 on the x-axis 103 than elsewhere on the chart 105.

In FIG. 2B, the plotting area 201 is tessellated into multiple bands/rectangles (e.g., rectangles 211, 213, 221, 231, 233, 235, etc.), and the example visualization 205 may be referred to as a rectangular-binned chart. The intensity levels (or dark levels) of the rectangles indicate the density of the data points that fall into the bands. In this example, the darker a rectangle is, the more data points it includes. The rectangular-binned visualization 205 shows that more data points fall within the 20 to 40 value range of the x-axis 203, for all three discrete categories of the y-axis 207.

Figure 3:
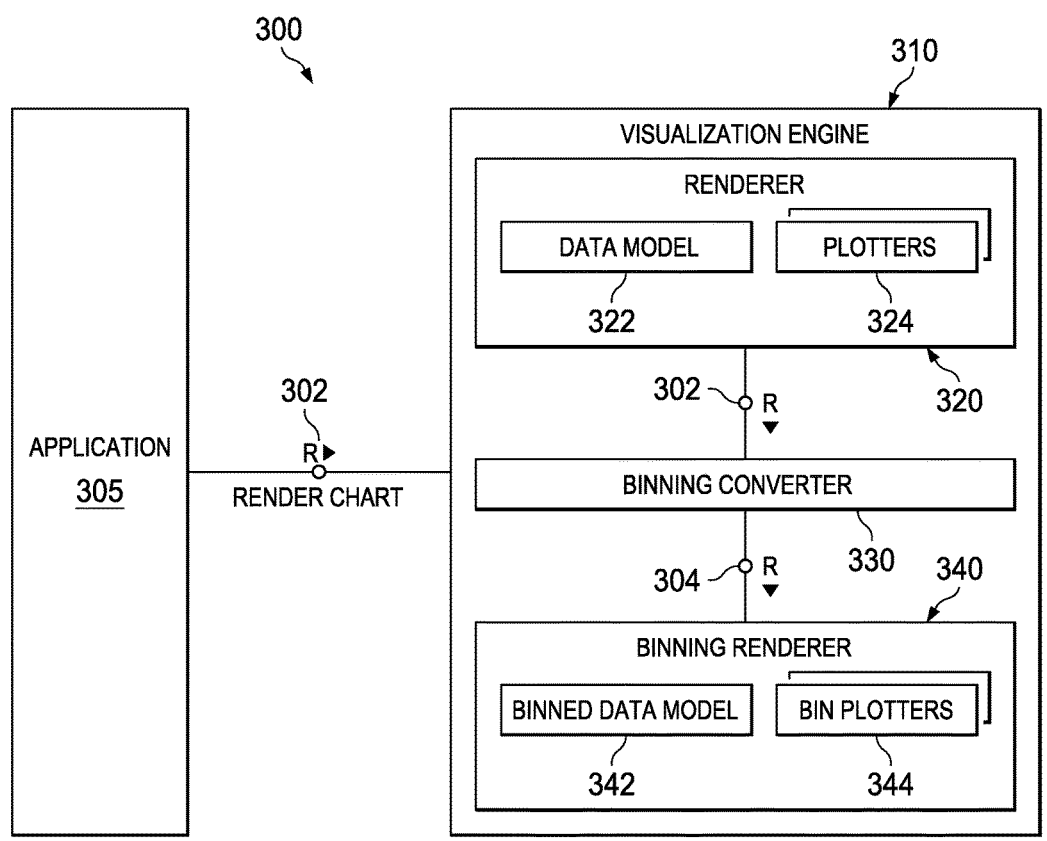
FIG. 3 is a block diagram illustrating an example computing environment for rendering a binned visualization of data.

FIG. 3 is a block diagram illustrating an example computing environment 300 for generating a binned chart for preventing overplotting. As shown, the example computing environment 300 includes an application 305 coupled to a visualization engine 310. The application 305 and the visualization engine 310 may reside on the same or on separate computing devices. For instance, the application 305 may be a client application running on a client computer while the visualization engine 310 may be implemented in a server or another computing device. The application 305 may be communicably linked to the visualization engine 310 over a network or another interface. In operation, the application 305 may submit a request 302 to the visualization engine 310 to generate (or render) a chart based on a set of data points. In some cases, the request 302 may include information about the data set (e.g., the size of the data set, values of the data points in the data set, location of the data set in a storage resource), a description of the required chart (e.g., a type, size, color, resolution of the chart), or any other information.

Upon receiving the request 302 from the application 305, the visualization engine 310 may analyze the request 302 to determine whether binning is needed to generate the requested chart. For example, the visualization engine 310 may determine that the rendered chart will be unsuitable for display on a user interface without binning. If the visualization engine 310 determines that binning is needed, the visualization engine 310 may use a binning renderer (e.g., the binning renderer 340) to generate a binned chart for display. Otherwise, a normal renderer (e.g., renderer 320) may be used to generate the requested chart.

As shown in FIG. 3, the visualization engine 310 includes a renderer 320, a binning converter 330, and a binning renderer 340. The renderer 320 includes a data model 322 and one or more plotters 324. The renderer 320 may feed the data model 322 into one of the plotters 324 to render a chart. The data model 322 may include objects in a particular language or data structure. For example, the data model 322 may include information describing x- and y-coordinates of the data points. In some implementations, the data model 322 may include color, size, geometry, viewpoint, texture, lighting, shading, or other information as a description of the requested chart. The plotters 324 may read and process the information contained in the data model 322 and generate a chart based on the information. The plotters 324 may include, for example, a bar chart plotter, a line chart plotter, a pie chart plotter, or other types of plotter for representing the data model 322 into a visual representation. The renderer 320 may be a component configured to produce an electronic representation of the requested chart. In some cases, the renderer 320 may produce the requested chart in an electronic graphical format, including, but not limited to, Graphics Interchange Format (GIF), Portable Document Format (PDF), Joint Photographic Experts Group (JPEG) format, Portable Network Graphics (PNG) format, Tagged Image File Format (TIFF), Bitmap (BMP) format, or other formats.

The binning renderer 340 includes a binned data model 342 and one or more plotters 344. In some implementations, the data model 342 required to perform binning is different from the data model 322 required for rendering a normal chart. For example, the binned data model 322 may include information of the x- and y-coordinates of the bins and the number of data points that fall into each bin. In some implementations, the binned data model 342 may also include information about visual representations of the bins. For example, the information may include one or more of a shape, a size, a color, a color intensity, an orientation, a location, or other displayed attributes that describes the visualization of the bins. In some cases, the binned data model 342 may include specification of what parameters, if any, to be displayed together with the bins. Example displayed parameters may include the number and the statistics (e.g., average, maximum, minimum, variance, percentage, probability, etc.) of the data points in each bin. The plotters 344 may be configured to read and process information that is compatible with the binned data model 342, and generate a binned chart based on the specification of the data model 342. In some cases, the renderer 340 may produce the requested chart in an electronic graphical format, including, but not limited to, GIF, PDF, JPEG, PNG, TIFF, BMP, or other formats.

In some implementations, the visualization engine 310 may perform autobinning such that it may switch to an overplotting-aware rendering mode (e.g., binning mode). For example, the visualization engine 310 may detect situations that will result in overplotting (described below), and determine whether to perform binning based on the determination. In some implementations, rather than returning an error message or a clustered chart (e.g., as shown in FIGS. 1A and 2A), or requiring a new shape of data or new calculations (e.g., from the application 305 or other sources), the visualization engine 310 may, with or without consulting the user, perform binning and provide a binned chart to the user. In some implementations, the visualization engine 310 may provide enhanced user interactions for data visualization. For example, the visualization engine 310 may generate a zoomed-in, zoomed-out, filtered, or otherwise modified chart based on the user's request. In some implementations, the visualization engine 310 allows the user to specify the shape, size, color, or other parameters, and generate the binned chart accordingly.

In some cases, if a renderer (e.g., the normal renderer 320) detects that binning is required, it may pass the request 302 or other information to the binning converter 330 to create bins and place the data points of the data set into the bins. For example, the binning converter 330 may generate a set of bins with positional coordinates as well as data point counts, the list of data points in each bin, or any other information that meets the requirements of the binned data model 342. Example techniques for creating bins and placing data points into corresponding bins are described below with respect to FIGS. 5-7. Based on the generated bins and the associated data points (e.g., denoted as 304 in FIG. 3), the binning renderer 340 may then render a binned chart accordingly.

As described with respect to FIGS. 1A-1B and 2A-2B, a plotting area may have one or more axes. The axes may define the plotting area or have other functions (e.g., being used as references). Each axis may include attributes such as, for example, an underlying parameter that the axis represents (e.g., income, revenue, year, etc.), the type of axis (e.g., continuous or discrete, numeric or categorical, etc.), a value range (e.g., a maximum, a minimum value, etc.), a granularity (e.g., the step/channel size), values/categories to be shown on the axis, a domain size (e.g., the total number of categories, the length/width/height (e.g., in terms of pixels) of the axis), or other attributes. The axis information may be provided by a user (e.g., included in the request 302 sent from the application 305 or other sources) or may be a default setting of the visualization engine 310.

In some cases, plotting areas may have different axis combinations such as, for example, continuous by continuous, continuous by discrete, and discrete by discrete. For instance, FIGS. 1A and 1B have continuous axes as both the horizontal and vertical axes (i.e., continuous by continuous); FIGS. 2A and 2B have continuous axes as the horizontal axes and discrete axes as the vertical axes (i.e., continuous by discrete). In general, a visualization engine (e.g., the visualization engine 310) may accept additional or different types of axes and axis combinations. In some implementations, the visualization engine may accept a wider variety of geometries in addition to or as alternatives to the axes.

Along a continuous axis, in some cases, it may be assumed there is a closeness of relationship in terms of proximity of positions. For example, on a scale that ranges from 0 to 100, values that fall at 30 and values that fall at 31 may be considered closely related (and perhaps indistinguishable). Even if the axis is not numeric in nature, for instance, a continuous date scale that ranges from January 1 to December 31, a closeness between July 17 and July 18 can still be assumed (again to the point of being indistinguishable).

On the other hand, on a discrete axis, proximity of positions does not necessarily imply any closeness of relationship of data. For instance, Cambodia and Canada may lie adjacent to one another on the scale, but this does not imply associative relationship between values that fall into these two categories.

In some implementations, along a continuous axis, bin size may be determined, for example, based on an appropriate level of granularity and complexity and/or a desirable resolution to be displayed in an output device. For example, the bin size may be determined to be anywhere from 10-30 pixels or any other appropriate size. Along a discrete axis, in some implementations, the categories themselves may serve as bins until the size of each category becomes less than a threshold. For example, threshold may be 3-5 pixels or any other appropriate size. If the size of each category becomes less than the threshold, binning across discrete categories/values may be performed despite no strong relationship among the combined multiple categories/values.

Figure 4A:
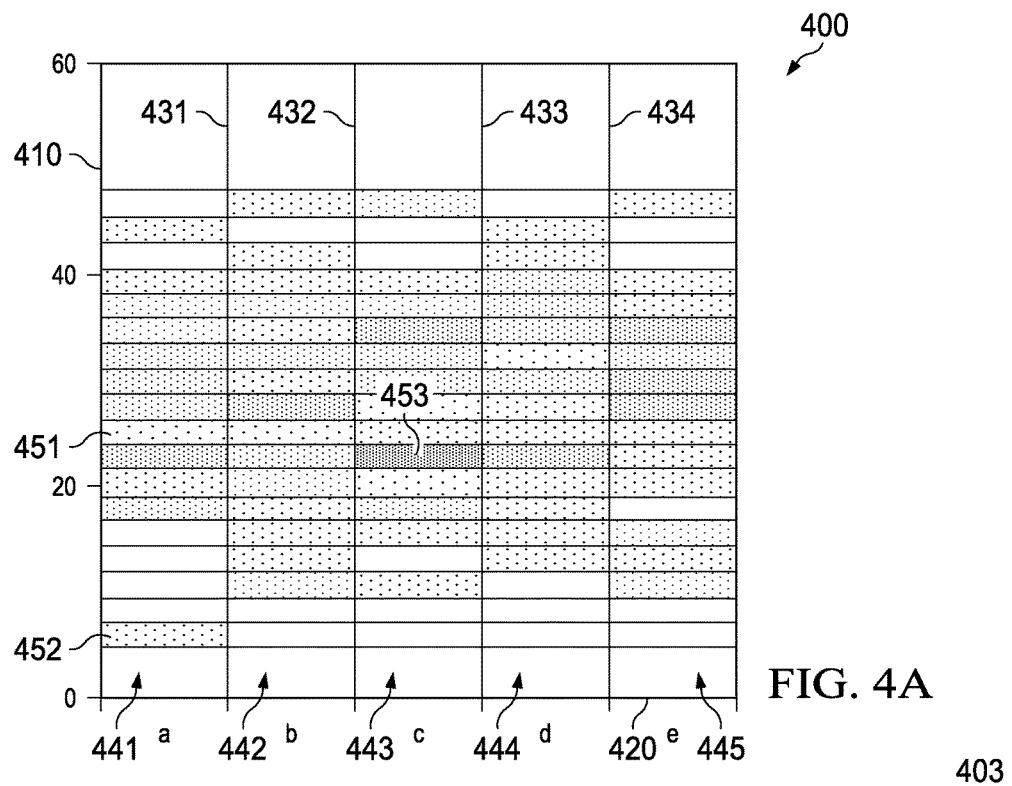
FIG. 4A-4C are plots illustrating example data visualizations with different sizes of bins.
Figure 4B:
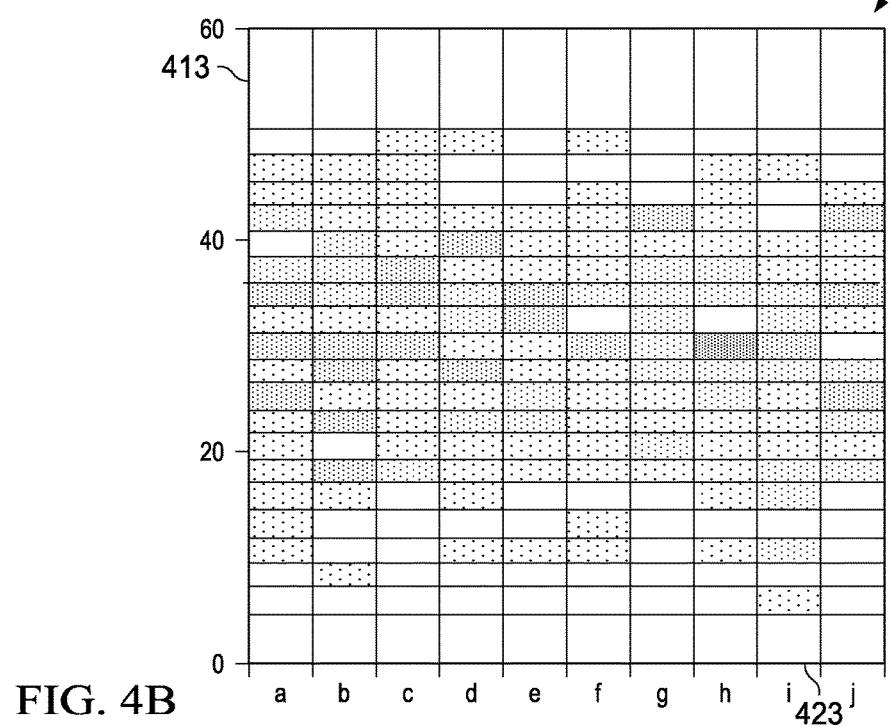
Figure 4C:
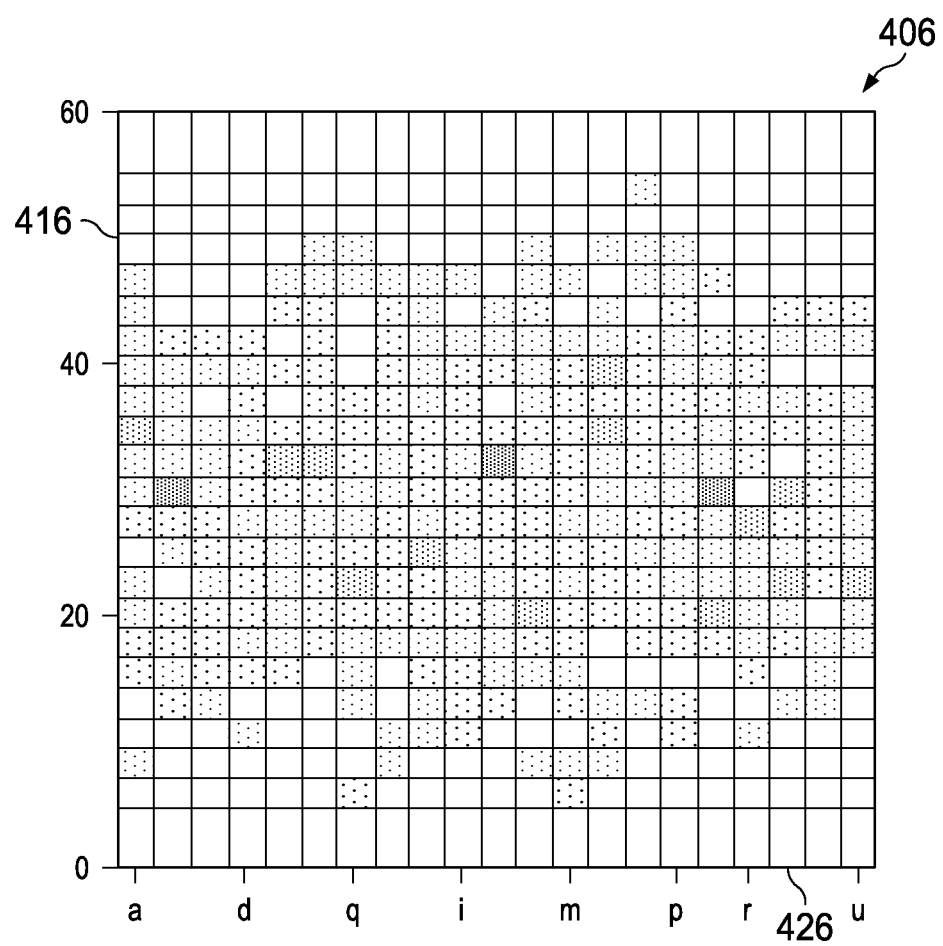

FIG. 4A-4C are plots illustrating example binned charts 400, 403, and 406 with different bin sizes. The example binned charts 400, 403, and 406 have continuous numerical y-axes 410, 413, and 416 and discrete categorical x-axes 420, 423, and 426, respectively. The continuous numerical y-axes 410, 413, and 416 are all segmented while each of the discrete categorical x-axes 420, 423, and 426 keeps its original segmentation until its bins or channels become too narrow. For example, in the left two binned charts 400 and 403, the resulting bins (e.g., bins 451, 452, 453, etc. in FIG. 4A) are determined based on the original segmentations (e.g., represented by segmentation lines 431, 432, 433, and 434 in FIG. 4A), while in the right binned chart 406, the x-axis 426 includes a-u 21 categories so the resulting original channel is narrow. In this case, a new set of bins may be generated by grouping data points belonging to two or more categorical channels. For example, data points with x-coordinates belonging to categories "a" and "b" may be grouped into the leftmost set of bins. Example techniques for creating bins in a plotting area are described in greater detail below with respect to FIG. 5.

For automatic detection of overplotting, different techniques may be used. For example, given that too many data points and/or too narrow channels may cause overplotting, detection algorithms may determine whether to apply binning to a data set based on the size of the data set and/or a channel size of the request chart. For instance, the detection algorithm may determine to perform binning if the number of data points in the data set is larger than a data size threshold, if x-axis of the plotting area is discrete and (the width of the plotting area/x-domain size) is less than a first channel size threshold, or if y-axis of the plotting area is discrete and (the height of the plotting area/y-domain size) is less than a second channel size threshold. Otherwise, the detection algorithm may determine that no binning is required. The first channel size threshold for the x-axis and the second channel size threshold for the y-axis may be the same or different. The values of the thresholds may be configured as needed, for example, based on hardware performance, resolution capabilities, or per user's input.

Figure 5:
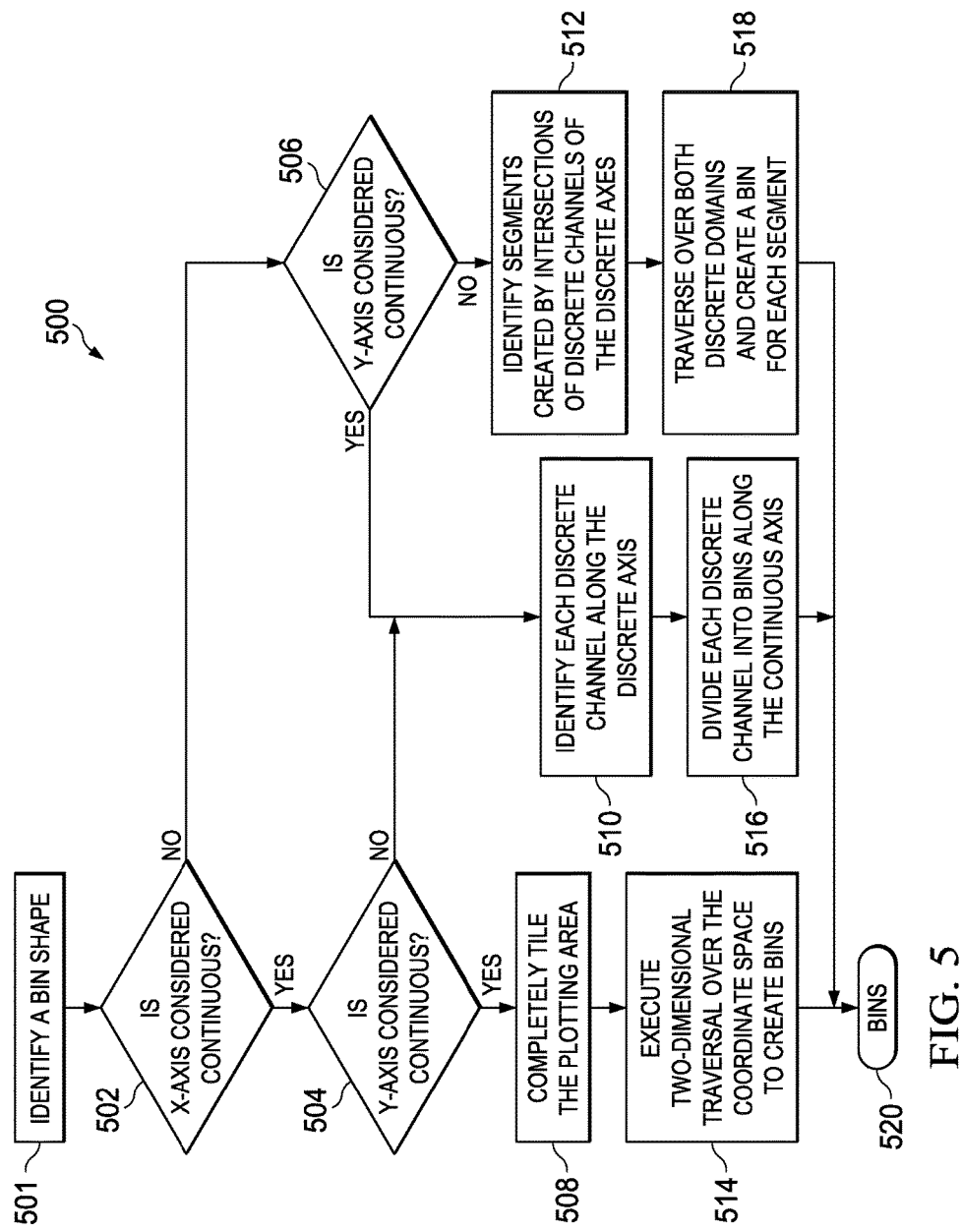
FIG. 5 is flow chart showing an example method for creating bins in a plotting area.
Figure 6:
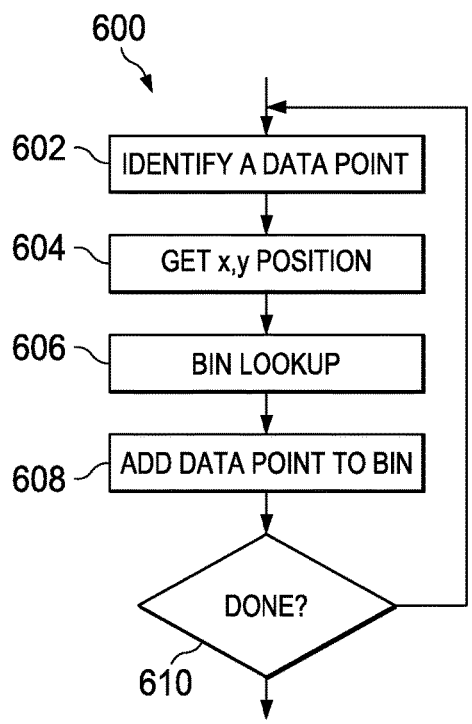
FIG. 6 is a flow chart illustrating an example method for assigning a data point into a bin.
Figure 7:
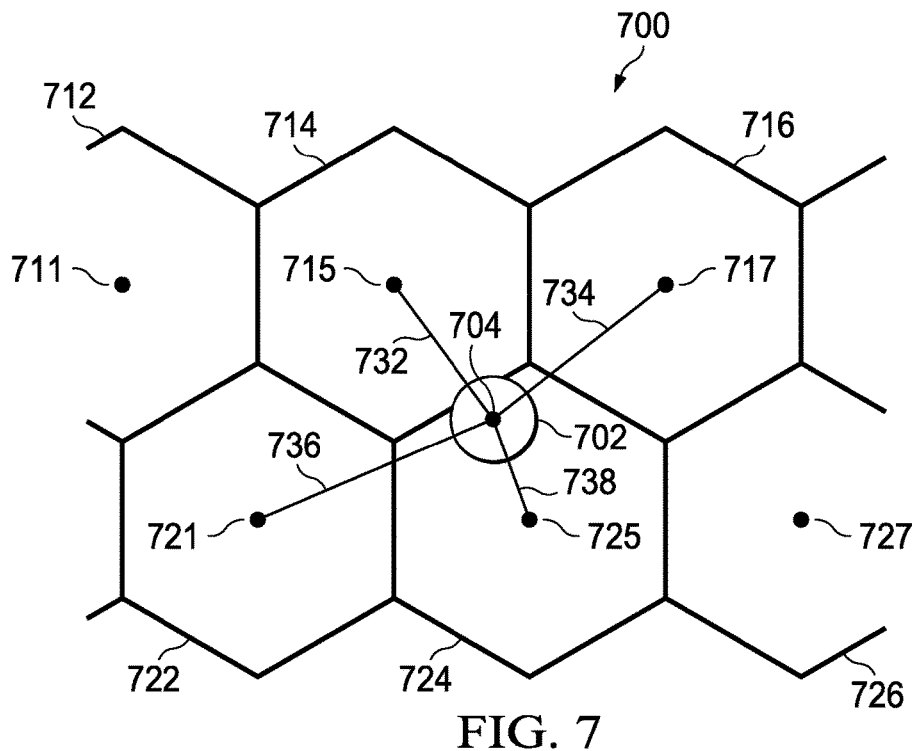
FIG. 7 is a diagram illustrating an example bin lookup process for assigning a data point into a bin.
Figure 8:
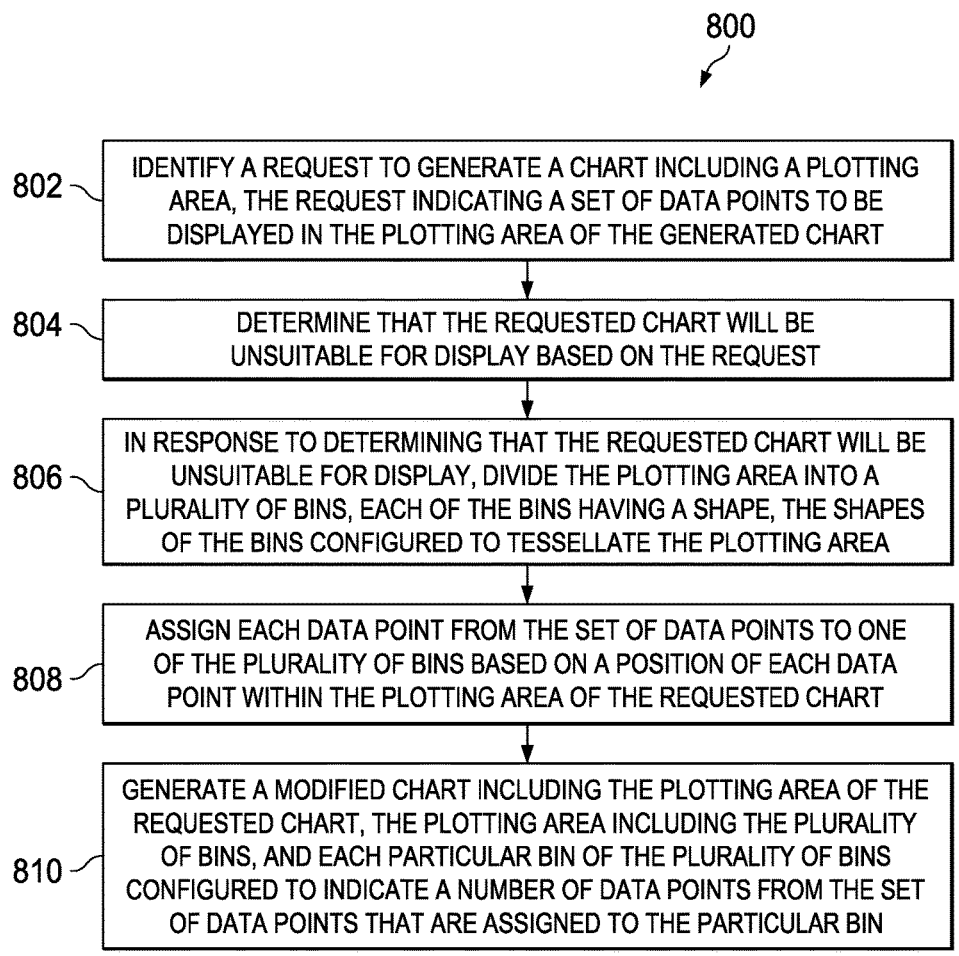
FIG. 8 is a flow chart showing an example method for performing binning to prevent overplotting for data visualization.

In the following, FIG. 5 is a flow chart illustrating an example method 500 for creating bins in a plotting area. FIG. 6 is a flow chart illustrating an example method 600 for assigning a data point into a bin. FIG. 7 is a diagram illustrating an example bin lookup process 700 for assigning a data point into a bin. FIG. 8 is a flow chart illustrating an example method 800 for performing binning to prevent overplotting for data visualization. For clarity of presentation, the description that follows generally describes methods 500, 600, 700, and 800 in the context of FIGS. 1A-1B, 2A-2B, 3, and 4A-4C. For example, the methods 500, 600, 700, and 800 may be performed by the visualization engine 310 (e.g., the binning converter 330 or other components) of FIG. 3. In some other implementations, the methods 500, 600, 700, and 800 may be performed, for example, by any other suitable system, environment, software, and hardware, or a combination of systems, environments, software, and hardware, as appropriate.

Referring to FIG. 5, the method 500 includes example operations for creating bins in a plotting area based on bin shapes and properties of the axes (e.g., a horizontal x-axis and a vertical y-axis) of the plotting area.

At 501, a bin shape is identified. The multiple bins in a plotting area may have the same or different shapes. The shape may include, for example, a triangle, a rectangle, a square, a hexagon, or another geometry that can tessellate the plotting area. In some implementations, the shapes of the bins may be, for example, specified by a user or automatically determined by the visualization engine 310.

At 502, whether the x-axis is continuous or discrete is determined. If the x-axis is continuous, the method 500 proceeds to 504 to determine whether the y-axis is continuous. If both the x-axis and the y-axis are continuous, at 508, the plotting area is tessellated based on the determined bin shapes. The tessellation may determine, for example, the center (e.g., the x- and y-coordinates of the center) and the size (e.g., the length and width in terms of the x- and y-coordinate ranges) of each bin. As an example, FIG. 1B shows the plotting area 101 with the continuous x-axis 103 and continuous y-axis 107 that is tessellated by hexagons.

In some implementations, the size of the bin can be fixed or varying according to the size of the plotting area. For example, the bin can have a fixed size that is spacious enough to include a reasonably sized label to indicate the count of data points within the bin. In some cases, the bin can have a size proportional to the size of the plotting area. For example, the size of each bin can be a percentage of the size of the plotting area and the total number of bins can be fixed, regardless of the size of the plotting area. Accordingly, the total number of rendered artifacts can be kept small and consistent, also ensuring that the bins will fit nicely within the plotting area (e.g., the shapes of bins won't be partially cut off at the boundary of the plotting area. In some implementations, a fixed size works better for hexagons, whereas a percentage size works better for rectangular bins.

In some implementations, the center or position of each bin may be determined, for example, based on the size of the bin and the size of the plotting area. For example, for rectangles with a size proportional to the size of the plotting area, say, 1/20th of each of the axes. Therefore it is known that the rectangles will fit perfectly along the axes and may be placed evenly apart so that none of the rectangles are cut off at either end of the axes. In another example, for hexagons with a fixed size, the will be some amount of cut off the edge of the plotting area. In some implementations, the hexagons may be placed one by one in the plotting area. For example, a starting point (e.g., (0, 0)) may be selected to place a first hexagon such that a minimum amount of the hexagon is cut off. For instance, the bottom left vertex of the hexagon may be placed at (0, 0) with its bottom edge aligned with the x-axis, rendering its center at (s/2,p) where s represents the length of each edge of the hexagon and p represents the distance from the edge to the center of the hexagon. Other hexagons in this first row may be offset by (3s, 0), i.e., the centers of the hexagons in the first row is represented by (s/2+3s*M), M being an integer number of hexagons in the first row. The Nth row above the first row may be offset by (1.5s, p*N) for an odd row while (0,p*N) for an even row—the odd rows get inset half way the distance between two hexagons to fit it with the row below. Additional or different techniques can be used to place the hexagons and other bin shapes.

At 514, a two-dimensional traversal is performed over the coordinate space to create bins on the plotting area. In some implementations, the two-dimensional traversal to determine the association of data points with the bins. For example, for rectangles, dividing and rounding down the data point's x and y coordinates by the size of the rectangle result in the index of the rectangle that the data point belongs to. For hexagons, two steps may be performed. The first step may provide a reduced set of candidate hexagons that the point may be associated with, for example, by determining the hexagons that the data point is nearby. For instance, dividing the data point's x and y coordinates by the size of the hexagon (e.g., divide the x-coordinate by s and dividing the y-coordinate by p) may return a lower-bound and upperbound of the x-y index of the hexagon by rounding up and down. As such, the x-y index of the hexagon can be one of the four hexagons characterized by the indices {(x-rounded down, y-rounded down), (x-rounded down, y-rounded up), (x-rounded up, y-rounded down), (x-rounded up, y-rounded up)}. This approach provides a simple and fast way to narrow the search down to four hexagons. Additional or different algorithms may be used to eliminate reduce the search down to three or another number of hexagons. The second step may determine which of the candidate hexagons that the data point belongs to, for example, by calculating the distance from the data point to each of the candidate hexagons. The hexagon with the minimum distance to the data point may be regarded as the one that contains the data point. The second step can be implemented efficiently as the reduced number of candidate hexagons returned in the first step. The example process 700 in FIG. 7 shows an example implementation of the second step.

After 514, the method 500 proceeds to 520, where multiple bins that tessellate the plotting area are obtained.

In some cases, it may be determined, at 502, that the x-axis is continuous and, at 504, that the y-axis is discrete. In some cases, it may be determined, at 502, that the x-axis is discrete and, at 506, that the y-axis is continuous. In either case, the method 500 proceeds to 510 to identify the discrete channels along the discrete axis, for example, by reusing or modifying the original segmentation of the discrete axis. For example, in FIG. 4A, the original segmentation (represented by segmentation lines 431, 432, 433 and 434) of the discrete x-axis 420 divides the plotting area of the chart 400 into five channels 441, 442, 443, 444, and 445, each channel representing one value (e.g., "a," "b," "c," "d," and "e") on the discrete axis 420, respectively. At 516, each discrete channel is divided into bins along the continuous channel. For example, in FIG. 4A, each of the channels 441, 442, 443, 444, and 445 may be divided along the continuous y-axis 410 to create the bins (e.g., bins 451, 452, 453, etc.) of the binned chart 400. At 520, multiple bins that tessellate the plotting area are obtained.

In some cases, it may be determined, at 502, that the x-axis is discrete and, at 506, that the y-axis is also discrete. In this case, the segmentations of the discrete axes is used to determine the bins. For example, intersections of the discrete channels of the two discrete channels may create a number of rectangles (including squares) and these rectangles may be used as the bins of plotting area. As such, at 512, the segments (e.g., the rectangles) may be identified and at 518, the domains of both discrete channels may be traversed and a bin may be generated for each segment. At 520, multiple bins that tessellate the plotting area are obtained. In some implementations, additional or different techniques may be applied for creating bins, for example, by grouping, dividing, or otherwise modifying one or more original segmentations of the discrete axes.

Referring to FIG. 6, the method 600 include example operations for assigning data points in a data set into respective bins. The example method 600 may iterate over the data set to assign the data point, for example, based on, relative locations of the data points and the bins in the plotting area. At 602, a data point is identified. At 604, the x- and y-coordinates of the data point are identified. At 606, a bin lookup process is performed to determine a bin that the data point should belong to. For example, given the bin shape is rectangular, the bin lookup process may assign the data point to the bin whose x- and y-coordinate ranges enclosing the x- and y-coordinates of the data point, respectively. In another example, given the bin shape is hexagonal, the bin lookup process may assign the data point to the bin whose center point is closest to the coordinate of the data point.

FIG. 7 is a diagram showing an example bin lookup process 700 for assigning a data point 702 to a bin. As shown in FIG. 7, the plotting area is tessellated into multiple hexagonal bins 712, 714, 716, 724, 726, etc. The data point 702 is represented as a circle with a center 704. The coordinate of the center 704 may represent the coordinate of the data point 702. The example bin lookup process 700 may determine the respective distances between the center 704 of the data point 702 and the centers of the bins. For example, the distances 732, 734, 736, and 738 between the center 704 and the centers 715, 717, 721, and 725 of the bins 714, 716, 722, and 724 may be determined, respectively. A minimum distance (e.g., the distance 738 in this example) may be identified. Accordingly, the data point 702 may be assigned to the hexagonal bin 724. In general, the bin lookup process may use additional or different criteria to assign a data point to a bin.

Referring back to FIG. 6, at 608, the data point is assigned to the identified bin. In some implementations, a list of assigned data points for each bin may be created, stored, and updated. At 610, whether all data points have been traversed may be determined. If all the data points have been checked, the example method 600 terminates; otherwise, the example method 600 goes back to 602 to determine an appropriate bin for a next data point.

Referring to FIG. 8, the method 800 includes example operations for performing binning to prevent overplotting for data visualization. At 802, a request to generate a chart including a plotting area is identified. The request (e.g., the request 302) may be received from a client application and may be identified by a visualization engine (e.g., the visualization engine 310). The request may indicate a set of data points to be displayed in the plotting area of the generated chart.

In some cases, the plotting area may be defined by a horizontal axis and a vertical axis (e.g., as shown in FIGS. 1A-1B, 2A-2B, 3, and 4A-4C). The horizontal axis or the vertical axis of the requested chart may be a continuous or a discrete axis. A discrete axis may define a number of channels spanning the plotting area, each channel representing one value on the discrete axis (e.g., as shown in FIG. 4A).

At 804, whether the requested chart will be unsuitable for display is determined based on the request. In some cases, determining that the requested chart will be unsuitable for display includes determining that the set of data points includes more than a threshold number of data points. In some cases, the threshold number of data points is determined based at least in part on a set of display capabilities of a device on which the requested chart is to be displayed. For example, the display capabilities of a device include a resolution of the display device, a length, width, and height of the screen of the display device (which may determine the length, width, and height of the plotting area to be displayed), or other properties. In some cases, at least one of the horizontal axis or the vertical axis of the requested chart is discrete axis. In this case, determining that the requested chart will be unsuitable for display includes determining that a size of each channel is less than a channel size threshold (e.g., 3-5 pixels).

At 806, in response to determining that the requested chart will be unsuitable for display, the plotting area is divided into multiple bins. Each of the bins has a shape and the shapes of the bins configured to tessellate the plotting area.

Example techniques for generating bins for the plotting area are previously described relative to FIG. 5.

At 808, each data point from the set of data points is assigned to one of the multiple bins based on a position of each data point within the plotting area of the requested chart. Example techniques for assigning data points into bins are previously described relative to FIGS. 6 and 7.

In some cases, each of the multiple bins is configured to indicate a number of data points from the set of data points that are assigned to the particular bin by modifying at least one displayed attribute (e.g., a color, a color intensity, a text number displayed within the particular bin, etc.) of the particular bin based on the number of data points. The displayed attributes may be used to provide visualization of the density of the data points in respective bins in the plotting area.

At 810, a modified chart including the plotting area of the requested chart is generated, for example, by the binning renderer 340 in FIG. 3. The plotting area includes the multiple bins, and each particular bin of the plurality of bins may be configured to indicate a number of data points from the set of data points that are assigned to the particular bin. The modified chart may also be referred to as a binned chart. FIGS. 1B, 2B, and 4A-4C show example modified charts with binning.

In some cases, the request is a first request and the chart is a first chart. A second request to generate a second chart different than the first chart may be identified. In some cases, it may be determined that the requested chart will be suitable for display based on the request. As such, and the second chart may be generated (e.g., by the normal renderer 320 in FIG. 3) in response to determining that the requested chart will be suitable for display. In some cases, it may be determined that the requested chart will not be suitable for display based on the request. As such, the second chart may be generated (e.g., by the binning renderer 340) in response to determining that the requested chart will be unsuitable for display.

In some implementations, after the modified chart is generated, a request to zoom in on a particular bin included in the modified chart may be identified. For instance, the request may be received by the visualization engine 310 from the application 305. The zoom-in request may be triggered, for example, by a user's operation on a touch-screen. In response to identifying the request, a new chart may be generated. The new chart may include a second horizontal axis representing a subsection of values represented by the first horizontal axis and a second vertical axis representing a subsection of values represented by the first vertical axis, wherein the second horizontal axis and the second vertical axis are chosen based on the particular bin. The new chart may be a binned chart or a normal chart depending on, for example, the number of data points in the particular bin and the size of the plotting area of the new chart. In some implementations, these procedures may be repeated and allow the user to drill down until a desired level of detail is reached, for example, for data analysis. Additional or different user interaction enhancements may be implemented based on the binned chart.

Figure 9:
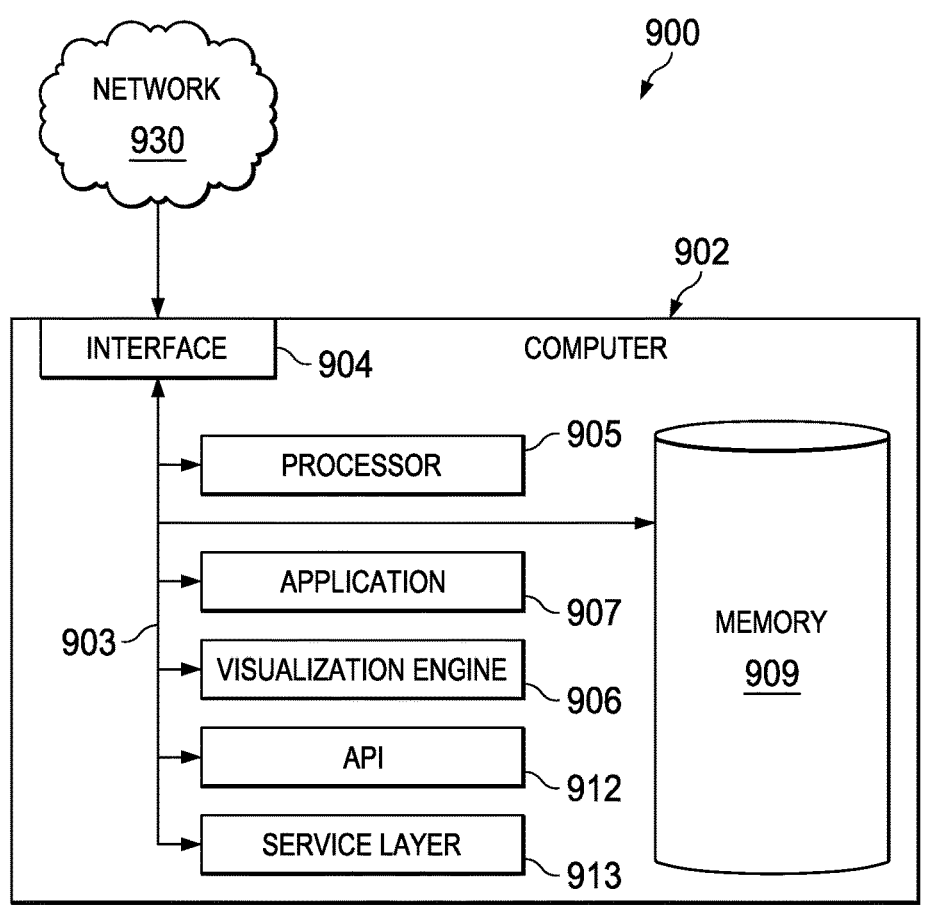
FIG. 9 is a block diagram of an exemplary computer used in the example computing environment according to an implementation.

FIG. 9 is a block diagram 900 of an exemplary computer 902 used in the example computing environment 300 according to an implementation. The computer 902 may include and/or make up one or more components of the computing environment 300 illustrated in FIG. 3 (e.g., the application 305, the visualization engine 310, the renderer 310, the binning converter 330, the binning renderer 340, etc.) for performing binning to prevent overplotting for data visualization.

The illustrated computer 902 is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 902 may comprise a computer that includes an input device, such as a keypad, keyboard, touch screen, or other device that may accept user information, and an output device that conveys information associated with the operation of the computer 902, including digital data, visual and/or audio information, or a GUI.

The computer 902 may serve as a client (e.g., that runs the application 305) and/or a server (e.g., that runs the visualization engine 310), for example, for executing binning and data visualization operations in a centralized, distributed, cloud-based, or another type of computing environment. The illustrated computer 902 is communicably coupled with a network 930. In some implementations, one or more components of the computer 902 may be configured to operate within a cloud-computing-based environment.

At a high level, the computer 902 is an electronic computing device operable to receive, transmit, process, store, or manage data and information associated with the computing environment 300. According to some implementations, the computer 902 may also include or be communicably coupled with an application server, e-mail server, web server, caching server, streaming data server, business intelligence (BI) server, and/or other server.

The computer 902 may receive requests over network 930 from a client application (e.g., a business application executing on another computer 902) and respond to the received requests by processing the said requests in an appropriate software application. In addition, requests may also be sent to the computer 902 from internal users (e.g., from a command console or by other appropriate access method), external or third-parties, other automated applications, as well as any other appropriate entities, individuals, systems, or computers.

Each of the components of the computer 902 may communicate using a system bus 903. In some implementations, any and/or all the components of the computer 902, both hardware and/or software, may interface with each other and/or the interface 904 over the system bus 903 using an application programming interface (API) 912 and/or a service layer 913. The API 912 may include specifications for routines, data structures, and object classes. The API 912 may be either computer-language independent or dependent and refer to a complete interface, a single function, or even a set of APIs. The service layer 913 provides software services to the computer 902 and/or the computing environment 300. The functionality of the computer 902 may be accessible for all service consumers using this service layer. Software services, such as those provided by the service layer 913, provide reusable, defined business functionalities through a defined interface. For example, the interface may be software written in JAVA, C++, or other suitable language providing data in extensible markup language (XML) format or other suitable format. While illustrated as an integrated component of the computer 902, alternative implementations may illustrate the API 912 and/or the service layer 913 as stand-alone components in relation to other components of the computer 902 and/or computing environment 300.

Moreover, any or all parts of the API 912 and/or the service layer 913 may be implemented as child or sub-modules of another software module, enterprise application, or hardware module without departing from the scope of this disclosure.

The computer 902 includes an interface 904. Although illustrated as a single interface 904 in FIG. 9, two or more interfaces 904 may be used according to particular needs, desires, or particular implementations of the computer 902 and/or computing environment 300. The interface 904 is used by the computer 902 for communicating with other systems in a distributed environment—including within the computing environment 300—connected to the network 930 (whether illustrated or not). Generally, the interface 904 includes logic encoded in software and/or hardware in a suitable combination and operable to communicate with the network 930. More specifically, the interface 904 may include software supporting one or more communication protocols associated with communications such that the network 930 or interface's hardware is operable to communicate physical signals within and outside of the illustrated computing environment 300.

The computer 902 includes a processor 905. Although illustrated as a single processor 905 in FIG. 9, two or more processors may be used according to particular needs, desires, or particular implementations of the computer 902 and/or the computing environment 300. Generally, the processor 905 executes instructions and manipulates data to perform the operations of the computer 902. Specifically, the processor 905 executes the functionality required to run one or more business applications, provide data visualization, and performing binning to prevent overplotting. In some implementations, the processor 905 may execute some or all operations of the example methods 500, 600, 700, and 800.

The computer 902 also includes a memory 909 that holds data for the computer 902 and/or other components of the computing environment 300. Although illustrated as a single memory 909 in FIG. 9, two or more memories may be used according to particular needs, desires, or particular implementations of the computer 902 and/or the computing environment 300. While memory 909 is illustrated as an integral component of the computer 902, in alternative implementations, memory 909 may be external to the computer 902 and/or the computing environment 300.

The application 907 is an algorithmic software engine providing functionality according to particular needs, desires, or particular implementations of the computer 902 and/or the computing environment 300, particularly with respect to functionality required to perform binning to prevent overplotting for data visualization. For example, application 907 may serve as the application 305 that submits a request for generating a chart. Further, although illustrated as a single application 907, the application 907 may be implemented as multiple applications 907 on the computer 902. In addition, although illustrated as integral to the computer 902, in alternative implementations, the application 907 may be external to the computer 902 and/or the computing environment 300.

The computer 902 further includes a visualization engine 906. The visualization engine 906 may be any application, program, module, process, or other software that may execute operations related to data visualization. The visualization engine 906 may include the example visualization engine 310 in FIG. 3 or other visualization engines in another computing environment. The visualization engine 906 may receive requests from one or more applications (e.g., the application 907) and may generate charts according to the requests. The visualization engine 906 may perform operations of the example methods 500, 600, 700, and 800. In some implementations, the visualization engine 906 may provided enhanced user interactions, for example, in the context of the data visualization.

There may be any number of computers 902 associated with, or external to, the computing environment 300 and communicating over network 930. Further, the term "client," "user," and other appropriate terminology may be used interchangeably as appropriate without departing from the scope of this disclosure. Moreover, this disclosure contemplates that many users may use one computer 902, or that one user may use multiple computers 902.

The preceding figures and accompanying description illustrate example processes and computer implementable techniques. The computing environment 300 (or its software or other components) contemplates using, implementing, or executing any suitable technique for performing these and other tasks. These processes are for illustration purposes only and that the described or similar techniques may be performed at any appropriate time, including concurrently, individually, or in combination. In addition, many of the steps in these processes may take place simultaneously, concurrently, and/or in different order than as shown. Moreover, the computing environment 300 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method executed by one or more processors, the method comprising:

identifying a first request to generate a chart including a first plotting area, the first request indicating a first set of data points to be displayed in the first plotting area of the generated chart, wherein the first plotting area is defined by a first horizontal axis and a first vertical axis and at least one of the first horizontal axis or the first vertical axis of the requested chart is a discrete axis defining a number of channels spanning the first plotting area, each channel representing one value on the discrete axis;

determining whether the requested chart will be unsuitable for display based on the first request, wherein determining whether the requested chart will be unsuitable comprises determining that a size of each channel of a discrete axis is less than a threshold number of pixels of a device on which the requested chart is to be displayed;

in response to determining that the requested chart will be unsuitable for display, automatically, and without user input requesting binning associated with the requested chart, causing a renderer to switch from a standard rendering mode to a binning mode and rendering the requested chart by:

dividing the first plotting area into a first plurality of bins, each of the bins having a shape, the shapes of the bins configured to tessellate the first plotting area in response to determining that the requested chart will be unsuitable for display;

assigning each data point from the set of data points to one of the first plurality of bins based on a position of each data point within the first plotting area of the requested chart;

generating a modified chart including the first plotting area of the requested chart, the plotting area including the plurality of bins, and each particular bin of the plurality of bins configured to indicate a number of data points from the set of data points that are assigned to the particular bin;

after generating the modified chart, identifying a second request to zoom in on a particular selected bin included in the modified chart; and in response to identifying the second request to zoom in on the particular selected bin, automatically generating a second modified chart with a second horizontal axis representing a subsection of values represented by the first horizontal axis and a second vertical axis representing a subsection of values represented by the first vertical axis, wherein the second horizontal axis and the second vertical axis are chosen based on the particular selected bin and correspond to a range of values represented by the particular selected bin, wherein the second modified chart is associated with a second plotting area based on the particular selected bin and the corresponding range of values represented by the particular bin, and wherein generating the second modified chart comprises:

dividing the second plotting area into a second plurality of bins different from the first plurality of bins, each of the bins having a shape, the shapes of the bins configured to tessellate the second plotting area;

assigning each data point from the set of data points to one of the second plurality of bins based on a position of each data point within the second plotting area;

generating a second modified chart including the second plotting area, the second plotting area including the second plurality of bins, and each particular bin of the second plurality of bins configured to indicate a number of data points from the set of data points that are assigned to the particular bin; and in response to determining that the requested chart is not unsuitable for display, rendering the identified chart using the standard rendering mode in accordance with the identified first request.

2. The method of claim 1, wherein determining that the requested chart will be unsuitable for display includes determining that the set of data points includes more than a threshold number of data points.

3. The method of claim 2, wherein the threshold number of data points is determined based at least in part on a set of display capabilities of the device on which the requested chart is to be displayed.

4. The method of claim 1, wherein each of the plurality of bins is configured to indicate a number of data points from the set of data points that are assigned to the particular bin by modifying at least one displayed attribute of the particular bin based on the number of data points.

5. The method of claim 4, wherein the at least one modified displayed attribute of the particular bin includes color.

6. The method of claim 4, wherein the at least one modified displayed attribute of the particular bin includes color intensity.

7. The method of claim 4, wherein the at least one modified displayed attribute of the particular bin includes a text number displayed within the particular bin.

8. A non-transitory, computer-readable medium storing instructions operable when executed to cause at least one processor to perform operations comprising:

identifying a first request to generate a chart including a first plotting area, the first request indicating a first set of data points to be displayed in first the plotting area of the generated chart, wherein the first plotting area is defined by a first horizontal axis and a first vertical axis and at least one of the first horizontal axis or the first vertical axis of the requested chart is a discrete axis defining a number of channels spanning the first plotting area, each channel representing one value on the discrete axis;

determining whether the requested chart will be unsuitable for display based on the first request, wherein determining whether the requested chart will be unsuitable comprises determining that a size of each channel of a discrete axis is less than a threshold number of pixels of a device on which the requested chart is to be displayed;

in response to determining that the requested chart will be unsuitable for display, automatically, and without user input requesting binning associated with the requested chart, causing a renderer to switch from a standard rendering mode to a binning mode and rendering the requested chart by:

dividing the first plotting area into first a plurality of bins, each of the bins having a shape, the shapes of the bins configured to tessellate the first plotting area in response to determining that the requested chart will be unsuitable for display;

assigning each data point from the set of data points to one of the first plurality of bins based on a position of each data point within the first plotting area of the requested chart;

generating a modified chart including the plotting area of the requested chart, the first plotting area including the plurality of bins, and each particular bin of the plurality of bins configured to indicate a number of data points from the set of data points that are assigned to the particular bin;

after generating the modified chart, identifying a second request to zoom in on a particular selected bin included in the modified chart; and in response to identifying the second request to zoom in on the particular selected bin, automatically generating a second modified chart with a second horizontal axis representing a subsection of values represented by the first horizontal axis and a second vertical axis representing a subsection of values represented by the first vertical axis, wherein the second modified chart is associated with a second plotting area based on the particular selected bin and the corresponding range of values represented by the particular bin, and wherein generating the second modified chart comprises:

dividing the second plotting area into a second plurality of bins different from the first plurality of bins, each of the bins having a shape, the shapes of the bins configured to tessellate the second plotting area;

assigning each data point from the set of data points to one of the second plurality of bins based on a position of each data point within the second plotting area;

generating a second modified chart including the second plotting area, the second plotting area including the second plurality of bins, and each particular bin of the second plurality of bins configured to indicate a number of data points from the set of data points that are assigned to the particular bin; and in response to determining that the requested chart is not unsuitable for display, rendering the identified chart using the standard rendering mode in accordance with the identified request.

9. The non-transitory, computer-readable medium of claim 8, wherein determining that the requested chart will be unsuitable for display includes determining that the set of data points includes more than a threshold number of data points.

10. The non-transitory, computer-readable medium of claim 9, wherein the threshold number of data points is determined based at least in part on a set of display capabilities of the device on which the requested chart is to be displayed.

11. A system comprising:

memory for storing data; and one or more processors operable to perform operations comprising:

identifying a first request to generate a chart including a first plotting area, the first request indicating a first set of data points to be displayed in the first plotting area of the generated chart, wherein the first plotting area is defined by a first horizontal axis and a first vertical axis and at least one of the first horizontal axis or the first vertical axis of the requested chart is a discrete axis defining a number of channels spanning the first plotting area, each channel representing one value on the discrete axis;

determining whether the requested chart will be unsuitable for display based on the first request, wherein determining whether the requested chart will be unsuitable comprises determining that a size of each channel of a discrete axis is less than a threshold number of pixels of a device on which the requested chart is to be displayed;

in response to determining that the requested chart will be unsuitable for display, automatically, and without user input requesting binning associated with the requested chart, causing a renderer to switch from a standard rendering mode to a binning mode and rendering the requested chart by:

dividing the first plotting area into a first plurality of bins, each of the bins having a shape, the shapes of the bins configured to tessellate the first plotting area in response to determining that the requested chart will be unsuitable for display;

assigning each data point from the set of data points to one of the first plurality of bins based on a position of each data point within the first plotting area of the requested chart; and generating a modified chart including the first plotting area of the requested chart, the first plotting area including the plurality of bins, and each particular bin of the plurality of bins configured to indicate a number of data points from the set of data points that are assigned to the particular bin;

after generating the modified chart, identifying a second request to zoom in on a particular selected bin included in the modified chart; and in response to identifying the second request to zoom in on the particular selected bin, automatically generating a second modified chart with a second horizontal axis representing a subsection of values represented by the first horizontal axis and a second vertical axis representing a subsection of values represented by the first vertical axis, wherein the second horizontal axis and the second vertical axis are chosen based on the particular selected bin and correspond to a range of values represented by the particular selected bin, wherein the second modified chart is associated with a second plotting area based on the particular selected bin and the corresponding range of values represented by the particular bin, and wherein generating the second modified chart comprises:

dividing the second plotting area into a second plurality of bins different from the first plurality of bins, each of the bins having a shape, the shapes of the bins configured to tessellate the second plotting area;

assigning each data point from the set of data points to one of the second plurality of bins based on a position of each data point within the second plotting area;

generating a second modified chart including the second plotting area, the second plotting area including the second plurality of bins, and each particular bin of the second plurality of bins configured to indicate a number of data points from the set of data points that are assigned to the particular bin; and in response to determining that the requested chart is not unsuitable for display, rendering the identified chart using the standard rendering mode in accordance with the identified request.

12. The system of claim 11, wherein determining that the requested chart will be unsuitable for display includes determining that the set of data points includes more than a threshold number of data points.

13. The system of claim 12, wherein the threshold number of data points is determined based at least in part on a set of display capabilities of the device on which the requested chart is to be displayed.

* * * * *